US009097610B2

United States Patent
Nilsson

(10) Patent No.: US 9,097,610 B2
(45) Date of Patent: Aug. 4, 2015

(54) METHOD AND ARRANGEMENT FOR LEAK DETECTION

(75) Inventor: Jan Nilsson, Kalmar (SE)

(73) Assignee: NORDEN MACHINERY AB, Kalmar (SE)

( * ) Notice: Subject to any disclaimer, the term of this patent is extended or adjusted under 35 U.S.C. 154(b) by 0 days.

(21) Appl. No.: 13/991,150

(22) PCT Filed: Mar. 12, 2012

(86) PCT No.: PCT/SE2012/050268
§ 371 (c)(1),
(2), (4) Date: Aug. 21, 2013

(87) PCT Pub. No.: WO2012/125108
PCT Pub. Date: Sep. 20, 2012

(65) Prior Publication Data
US 2013/0318917 A1 Dec. 5, 2013

(30) Foreign Application Priority Data

Mar. 16, 2011 (SE) ........................................ 1150228

(51) Int. Cl.
G01M 3/32 (2006.01)
G01M 3/22 (2006.01)

(52) U.S. Cl.
CPC . *G01M 3/32* (2013.01); *G01M 3/22* (2013.01); *G01M 3/229* (2013.01); *G01M 3/3209* (2013.01); *G01M 3/3272* (2013.01); *G01M 3/3281* (2013.01)

(58) Field of Classification Search
CPC ....... G01M 3/22; G01M 3/32; G01M 3/3281; G01M 3/329; G01M 3/04; G01M 3/226; G01M 3/007; G01M 3/10; G01M 3/34; G01M 3/3272; G01M 3/229; G01M 3/3209

USPC ............ 73/40.7, 37, 37.6, 37.8, 40, 41, 41.4, 73/45.4, 49.2, 49.3, 40.5 R, 49.1, 865.8, 52
See application file for complete search history.

(56) References Cited

U.S. PATENT DOCUMENTS 3,751,972 A * 8/1973 Hass .............................. 73/45.4
3,825,750 A 7/1974 Hayase et al.
(Continued)

FOREIGN PATENT DOCUMENTS

DE 102008047820 A1 4/2010

OTHER PUBLICATIONS

International Preliminary Report on Patentability dated Jan. 23, 2013 issued in corresponding International Patent Application No. PCT/SE2012/050268.

(Continued)

*Primary Examiner* — Hezron E Williams
*Assistant Examiner* — Marrit Eyassu
(74) *Attorney, Agent, or Firm* — Knobbe Martens Olson & Bear LLP

(57) ABSTRACT

The invention relates to a method and an arrangement for detecting a leak in a sealed package containing a product in the form of a foodstuff or a pharmaceutical. The leak detecting arrangement comprises a testing station, in which a package is placed by the transporting means and a pressure applying means arranged to apply a predetermined amount of pressure on the package located in the testing station. The arrangement further comprises a continuously operated suction means arranged to draw ambient air past a seal on the packet to be tested and a gas sensor located in the flow of ambient air drawn off by the suction means and arranged to transmit a signal dependent on the test gas concentration detected in the ambient air.

10 Claims, 5 Drawing Sheets

(56) References Cited

U.S. PATENT DOCUMENTS

| | | | |
|---|---|---|---|
| 5,029,463 A * | 7/1991 | Schvester et al. | 73/40.7 |
| 5,226,316 A * | 7/1993 | Mally et al. | 73/49.3 |
| 5,345,814 A * | 9/1994 | Cur et al. | 73/49.3 |
| 5,373,729 A * | 12/1994 | Seigeot | 73/49.3 |
| 5,633,454 A * | 5/1997 | Abe et al. | 73/40 |
| 5,681,983 A | 10/1997 | Seigeot | |
| 6,018,987 A * | 2/2000 | Mayer et al. | 73/49.2 |
| 6,964,191 B1 * | 11/2005 | Tata | 73/38 |
| 2006/0075968 A1 * | 4/2006 | Leung et al. | 118/723 R |
| 2008/0092633 A1 * | 4/2008 | Wagner | 73/40.7 |
| 2008/0168826 A1 * | 7/2008 | Saidi et al. | 73/40 |
| 2011/0184265 A1 * | 7/2011 | Hayter | 600/347 |
| 2012/0037796 A1 * | 2/2012 | Lehmann | 250/282 |

OTHER PUBLICATIONS

Extended European Search Report dated Nov. 20, 2014 in corresponding EP application No. 12758268.

* cited by examiner

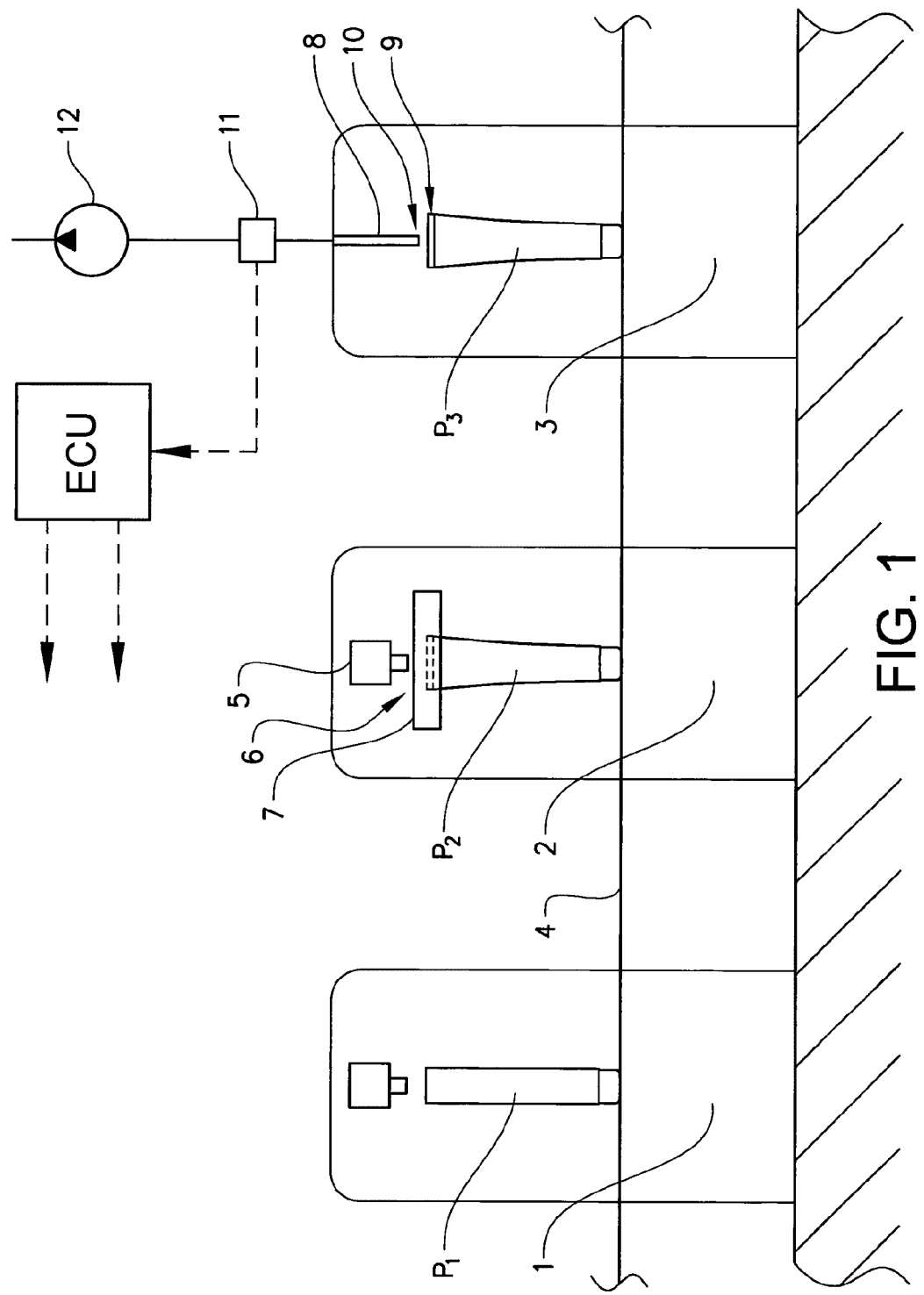

METHOD AND ARRANGEMENT FOR LEAK DETECTION

CROSS-REFERENCE TO RELATED APPLICATIONS

This application is the U.S. National Phase under 35. U.S.C. §371 of International Application PCT/SE2012/050268, filed Mar. 12, 2012, which claims priority to Swedish Patent Application No. 1150228-3, filed Mar. 16, 2011.

TECHNICAL FIELD

The invention relates to a method and an arrangement for high speed testing for leakage in gas filled containers. Applications of this type are often used in the packaging industry and the invention is aimed at full production speed detection of leaks in sealed packages containing a perishable product in the form of cosmetic, chemical or pharmaceutical products, toothpaste, a foodstuff or similar. The arrangement according to the invention allows for high speed, in-line, non-destructive testing of the integrity and tightness of a seal on such a package.

BACKGROUND ART

It is known to prolong and safeguard the shelf life of perishable products by modifying the atmosphere in the free space remaining in the package after filling the product. The most common gases used in a modified atmosphere package (MAP) are nitrogen, $CO_2$ and oxygen or mixtures thereof. Oxygen is mainly used for keeping fresh meat red or for controlling the ripening rate of fruit and vegetables, whereas nitrogen and $CO_2$ is used for reducing the ageing effects of oxygen and reducing aerobic growth of micro-organisms in a multitude of products.

The packaging material in MAPs can be any essentially gas tight material including plastic film or coating, film coated paper and thin metal foils.

A leak in the package due to production errors or from later damage will result in at least a partial loss of the modified atmosphere and the predicted shelf life may be shortened.

A common cause of leakage is product residue or splashes deposited on the sealing surfaces prior to closure with welding or other techniques. Studies of the effect of different leak diameters therefore assume a length of the leak path in the order of several millimeters.

Maximum tolerable leak diameters in the food industry range from 5 to 150 µm depending on the content and the purpose of the package.

For MAPs intended to prevent microbial growth and oxidation of sterile and antiseptic content maximum the leak diameter is typically observed to be in the range of 5-25 µm whereas tolerable leaks for ready-to-eat meals with shorter shelf life is in the range of 30-50 µm.

Baked and dried goods mainly susceptible to mould growth and humidity changes can normally tolerate leak diameter of 50 to 130 µm.

Various leak testing arrangements have been presented and, in some cases, also used to prevent leaking packages from reaching the shop shelves.

A common limitation in many known methods is that they cannot perform 100% testing for the quoted leak diameters on individual packages at full production line speeds exceeding 30 packages per minute. This problem can be circumvented by either restricting testing to off-line spot testing or by making batch testing of a suitable number of packages in the same test cycle.

One possible way to increase testing capacity is to provide a number of parallel testing arrangements, each working at a lower speed but collectively matching the cycle time of the filling line.

EP 0 894 252 B1 discloses a leak testing method allegedly capable of performing individual package testing "very quickly, typically in about one second" indicating testing capacity of up to 60 packages per minute.

The method disclosed in EP 0 894 252 B1 employs diluted hydrogen as tracer gas. Hydrogen and helium are commonly used as tracer gases for leak testing. One problem with these gases is their relatively high diffusion rate through the thin polymer films and other packaging materials used as gas barriers in packaging materials. If the tracer gas diffuses through the non-leaking walls of the package there is a risk that the leak testing arrangement will detect a diffusion leakage that is not a package integrity problem. This problem can be overcome if the time between filling the gas and testing for leakage is sufficiently short so that the leak detection is performed before the gas has permeated through the barrier material. This break-through time is in the order of a few seconds to several minutes depending on the material used and on the thickness of the film.

The method disclosed in EP 0 894 252 B1 has in practice not been demonstrated to fulfil the production speeds promised. The mains reasons for this are:
- The response time of the proposed type of sensor (palladium film) is too long for high speed leak testing. This is in fact true for almost all commercially available hydrogen sensors.
- The recovery time of the proposed sensor is too long. The recovery time is in the order of 1-10 seconds which holds true for most commercially available sensors.
- After detecting a larger leak there is a period during which the sensor exhibits a reduced sensitivity, which means that there is a period of typically 15-90 seconds after the detection of a large leak during which the sensor cannot detect smaller leaks.

The response time of a sensor is defined as the time needed for the sensor to reach 90% of the final signal value when exposed to a certain concentration of gas. Typical response times for most commercial hydrogen sensors are in the order of 5-30 s. Even with response time reducing algorithms, the response time achieved by commercial sensors are never below one second for the concentration values typically used in EP08942528.

Reaction time, which is the time to reach 10% of full signal, is often quoted and is often erroneously called "response time". The reaction time can be down to 0.1 seconds for the best commercially available sensors.

Both reaction and response times are typically longer for lower concentrations. This is due to diffusion processes inside the sensor housing and inside the active material of the sensor. The rate of concentration increase of gas inside the sensor housing and inside the sensing material is slower the lower the concentration gradient is in front of the sensor which results in slower reaction and response for low concentrations.

One way of reducing the reaction and response times is to operate the sensor at a higher temperature. This enhances diffusion in the housing as the gas in heated and the diffusion inside the sensing material is likewise enhanced, whereby response and recovery time is reduced. Such sensors are, however, always mounted in bigger housings to reduce loss of thermal energy and to ensure that materials used are not destroyed. Most of the improvements in response time are therefore lost on a system level and it remains problematic to reach the production rates wanted within the industry.

Another way of reducing the reaction and response time is to minimise the distance the gas needs to diffuse from the flow path outside the sensor housing in to the surface of the actual sensing material. The diffusion inside the sensing material also plays a major role for the response time.

EP 0 894 252 B1 employs a chamber in which the package is placed. The chamber is subsequently closed and a limited negative pressure is drawn.

The document argues that this limited vacuum level, as compared to levels used in previous arrangements for gas testing, can be achieved quickly and with low cost means. The packages should be kept in the chamber for a dwell time claimed to be in the range of 0.5 to 60 seconds.

EP 0 894 252 B1 does not clearly explain the different steps contributing to the total cycle time. The total cycle comprises at least the following steps:
1) Loading of a package. Moving the package into position and closing the chamber.
2) Chamber pressure reduction.
3) Sampling time. The time needed to bring the tracer gas from the exit of the leak to a position directly in front of the sensor.
4) Reaction time of the sensor.
5) Sensor response time. Time needed by sensor algorithm or circuitry to decide level of leakage. This is the time during which the signal is recorded or tracked to give sufficient information for a fair estimate of the magnitude of leakage.
6) Chamber flushing and sensor recovery in case of a leak signal.
7) Unloading the package.

The dwell time mentioned in EP 0 894 252 B1 would then seem to include the steps 3 to 5.

It is possible to partially reduce the time needed for some of these steps by letting these steps be carried out in parallel. It is for example evident that loading of the next package can be carried out in the same sequence as unloading the just tested package. Another example of such optimization is to allow for some of the sensor recovery time take place during the unloading/loading step.

However, even with the best practice, additional time is needed for decreasing the pressure in the chamber and, most of all, for true sensor recovery. The sensor recovery time is long and often not entirely predictable.

This poses large restraints on the automation system in that the process cannot run at a constant speed.

The invention disclosed in EP 0 894 252 B1 can therefore not fulfil production speeds faster than 60 packages per minute that is requested in industry today. It is even doubtful if a speed of 30 packages per second can be reached.

This means that there is still a need for a robust, fast and reliable leak testing method and arrangement for packages containing perishable products in the form of cosmetic, chemical or pharmaceutical products, toothpaste, a foodstuff or similar. Similar needs for high speed testing also exists in other areas such as for example within the refrigeration and automotive industries.

DISCLOSURE OF INVENTION

It is an object of the present invention to provide a novel arrangement and a method for detecting a leak in a sealed package containing a liquid or pasty product in the form of cosmetic, chemical or pharmaceutical products, toothpaste, foodstuff or similar. It is a further object of the invention to provide a robust, fast and reliable leak testing arrangement for soft, pliable and semi-hard packages, containers and other hollow objects. The object is achieved by means of an arrangement as described in the appended claims.

The invention is based on the use of a test gas that is detected by a gas sensor when leaking from the tested object. The full benefit of the invention is achieved by combining three features that each, by themselves, significantly reduces the testing time and combined enables test speeds of at least four packages per second using only one sensor.

The first feature is a novel signal processing routine.
The second feature is an open hood or flow guide applied over a part of the package to be tested for leakage.
The third feature is means to create a higher pressure inside the package compared to the ambient during the gas sampling step.

The scope of the invention is mainly to provide an arrangement for detecting a leak in soft, pliable and semi-hard packages. The invention is particularly suitable for detecting a leak in a seal or closure in soft, pliable and semi-hard packages. In the subsequent text, the term "seal" will be used for the portion of the package to be tested.

According to one embodiment, the invention relates to a leak detecting arrangement for packages, which packages contain a test gas. The leak detecting arrangement is located adjacent a transport means for transporting the packages, the arrangement comprising a testing station in which a package is located by the transport means, wherein the packages are arranged to have an internal pressure above the ambient pressure when located in the testing station.

The arrangement comprises a gas sensor located in gas communication with the ambient air surrounding a portion of the package to be tested, wherein the sensor is arranged to detect the concentration of test gas in said ambient air and transmit a signal representing said concentration. The signal can be proportional to said concentration. The arrangement further comprises an electronic control unit (ECU) arranged to receive the signal from the gas sensor, wherein the electronic control unit is arranged to determine an instantaneous slope value for the concentration of test gas in the ambient, to monitor instantaneous slope values over time and to generate a fault signal if an instantaneous slope value exceeds the preceding monitored instantaneous slope value.

The leak detecting arrangement is preferably intended for packages containing perishable products in the form of a foodstuff, cosmetics, toothpaste or various chemical or pharmaceutical products.

According to one example, the arrangement further comprises a continuously or intermittently operated suction means arranged to draw ambient air past a seal or closure on the packet to be tested and a gas sensor located in the flow of ambient air drawn off by the suction means. A flow guide is applied over the part of the package to be tested for leakage in order to guide the air flow past the seal or closure towards the gas sensor. The flow guide means is advantageously arranged to extend around the outer periphery of the seal and extend a predetermined distance past the seal over the package. The gas sensor will be referred to as a "sensor" in the subsequent text.

The placement and removal of a leaking package in front of the suction means results in a fast increase or decrease in gas concentration resulting in a significant concentration gradient in front of the sensor. As described above this will, accordingly, result in a quick initial change in the gas concentration in the sensor itself. By evaluating this initial and rapid change in signal instead of the resulting steady-state output signal of the sensor or sensors is it possible to achieve a fairly good prediction of the actual gas concentration and thereby the leakage. By this method the speed will not be limited by the total response time but rather the reaction time.

One limitation of this approach is that the accuracy of the measurement of the leak rate becomes lower. Another limitation is that the smallest leaks relevant for long shelf life aseptic or sterile packages still cannot be detected at the highest speeds. Most leaks through seals or closures are, however, considerably larger than the actual desired limit and it is evident that the vast majority of leaks will be detected and that the overall quality of the product will be significantly enhanced even if the smallest leaks cannot be detected.

The main benefit of invention as described in the above examples is that individual objects can be tested directly after filling. This reduces unnecessary scrapping from batch testing and gives immediate feedback on process deviations giving valuable information for optimising the production and maintaining the highest possible up-time of the production equipment.

The evaluation of the signal trend is based on the detection of changes in the slope of the sensor output signal. This can be done irrespective of whether the signal, prior to the current test, is having a positive or negative trend or is a constant, flat base line.

It is evident those skilled in the art that the described signal processing routine works both for sensors giving a direct or reversed output signal, i.e. irrespective of whether the output signal decreases (negative slope) or increases (positive slope) as the concentration of test gas increases. This is simply a question looking for a change in the correct direction. It is also evident that the output signal of the sensor can be in the form a current, voltage, frequency, capacitance or any other analogue entity as well as optical or numerical.

For clarity, the following description assumes a sensor whose output signal increases with increasing gas concentration. As argued above, when a leak is detected, the slope of the signal will become positive when the gas concentration in the sensor increases. If a subsequent leak is detected as the signal has a negative slope, returning towards the base line, the slope will become less negative and eventually positive when the gas concentration in the sensor increases. Hence a change of the slope value, as described above, is detected for a current package, this indicates that a leak is present in the package that has just been moved into the testing station.

The high speed evaluation is carried out by synchronising such changes in signal slope with the sampling of tracer gas leaking from the package. The magnitude of the leakage is, in a first approximation evaluated as the difference in slope value before and after the sampling of tracer gas leaking from the package.

The actual synchronisation is adjusted for possible delay times in the sampling and other relevant factors.

A further improvement in testing speed is achieved by employing thin film sensor instead of thick film sensors. The thin films, such as for example palladium or any other platinum group metal or alloys thereof reaches equilibrium much faster than a thick film at same operating temperature due to shorter diffusion distance through the film.

In order to achieve the requested speed of testing it is essential that the total pressure in the test gas inside the package is higher than the ambient pressure so that tracer gas is forced to flow through possible leaks. This higher pressure can be created in any suitable way. In one embodiment this is created by the package sealing step in such a way that the seal is formed in such a way that the internal volume of the package is reduced after the seal has been formed. In another embodiment the higher pressure is instead created by means of applying a force on the exterior of the package during the gas sampling step. This can be through a mechanical device exerting an external force on the package.

Mechanical force applying means is a faster and easier way of creating a pressure difference between the inside and the outside of the package than using a chamber equipped with evacuation means.

The preferred embodiment is to use mechanical pressure raising means arranged to apply a predetermined force on one or on opposite sides of the package. The application of force on the package is preferably made in the vicinity of the seal or closure. The means of application may be selected depending on the type of conveyor used for transporting the packages past the leak detecting arrangement.

According to one alternative, the transport means can comprise a stepping conveyor with a predetermined cycle time and a predetermined dwell time. The cycle time is inherently always greater than the dwell time. In this case the force applying means is arranged to apply a predetermined force on the package during the dwell time of the conveyor Force can be applied to the package from one side, pressing the package against a stationary surface or simultaneously from both sides, squeezing the package between a pair of controllable actuators. Examples of suitable force applying means can be at least one electrically or fluid operated actuator.

The duration of the actuation of the force applying means is shorter than the cycle time and dwell time of the transporting means and is dependent on the speed of the transporting means.

Suitable feed rates for a transportation means used for conveying filled packages, which can be placed in an upright position for testing an end seal, is 25-240 units per minute. At these speeds the cycle time can be in the interval 0.25-2.5 seconds and the dwell time can be in the interval 0.15-2 seconds. Examples of cycle and dwell times for different feed rates in a machine of this type are given below.

Example 1: For a transporting means operating at 25 units per minute, the cycle time is approximately 2.5 seconds and the force applying means is actuated during a dwell time of approximately 2.0 seconds.

Example 2: For a transporting means operating at 100 units per minute, the cycle time is approximately 0.6 seconds and the force applying means is actuated during a dwell time of approximately 0.4 seconds.

Example 3: For a transporting means operating at 120 units per minute, the cycle time is approximately 0.5 seconds and the force applying means is actuated during a dwell time of approximately 0.3 seconds.

Example 4: For a transporting means operating at 240 units per minute, the cycle time is approximately 0.25 seconds and the force applying means is actuated during a dwell time of approximately 0.15 seconds.

The duration of the actuation of the force applying means is marginally shorter than the dwell time, as the package must come to a halt before force is applied. The pressure must also be released before the end of the dwell time period so that the package is not snagged as it is displaced out of the testing station. The total time taken for the closing and opening action is at least 0.1 seconds. The times in the above examples may vary depending on the type of machine used.

According to a second alternative, the transport means can comprise a continuously moving conveyor. In this case the force applying means is arranged to apply a predetermined force on each package as the packages are conveyed past the suction means in the testing area at a constant speed. The force applying means can comprise a pair of opposing controllable actuators which can be moved parallel to the transporting means, which actuators can move with the transporting means and apply a predetermined pressure to a package as it passes the suction means, before returning to its initial position. Alternatively the force applying means comprises a pair of further conveyors moving at the same speed as the transporting means on either side of the package, which further conveyors can comprise belts or rollers arranged to apply a predetermined amount of pressure on the package being tested over a predetermined distance as the package passes the suction means. In this case the cycle time is determined by the time taken for the seal to pass the suction means.

As mentioned above the suction means can be either continuously or intermittently operated.

The former is normally better from a speed point of view as length of exposure is reduced. If concentration is high enough there will be a sufficient amount of gas trapped inside the sensor housing to allow a fair estimation of the level leakage.

An intermittently operated suction means can be set up to sequentially suck (sample), hold and release a gas sample. This scheme is normally better from a sensitivity point of view as the sample gas can be held in front of the sensor for to diffuse into the sensor for a longer time.

The suction means is preferably located adjacent the seal of a packet located in the testing station and is preferably, but not necessarily located above the seal.

The suction means may be provided with a suction opening conforming to the shape of the seal. If the transport means comprises a stepping conveyor, the suction opening can have the same general shape as the portion of the seal facing the said opening. However, the cross-sectional area of the suction opening is preferably larger than the cross-sectional area of the seal adjacent the opening. The suction opening can also be arranged to at least partially surround the seal. For instance, a package being moved continuously past the testing station can pass through a flow guide means comprising at least a pair of opposing side walls and an upper wall, forming an inverted U-shaped channel. Such an arrangement is preferable for packages being moved continuously past the testing station.

For a package being moved intermittently past the testing station, the flow guide means can have a general shape conforming to the shape of the seal to surround the seal on all sides. According to a further example, the flow guide means can be positioned to extend around the entire outer periphery of the seal and a predetermined distance past the seal over the package. The flow guide means aims to reduce the volume of ambient air around the seal, which allows relatively small amounts of leaking gas to be detected. The flow guide means also causes the velocity of the ambient air drawn past the seal to be increased, as compared with an arrangement lacking such a flow guide means. This helps increasing the speed of testing by reducing the time needed to sample gas. Another important role of the flow guide is to capture jets of test gas emitted from relatively large leaks. Such jets are known to be able to escape being caught by a passing sampling flow. Jets emitted inside the flow guide will be deflected by the walls of the flow guide, break up and thereby be captured by the sampling flow and thus properly detected.

A further advantage of the flow guide arrangement as opposed to a sealed chamber is that a sealed chamber is difficult to build and maintain in a fast and flexible automated machine. The combination of an open hood/flow guide and the application of a mechanical force on the package will contribute to the result, i.e. an increased flow of gas out of a possible leak in the package.

A flow guide with optimized dead space around the package is quickly purged by the sampling flow alone and no extra flushing means is needed.

A conventional fan or other cheap air circulator can be used to clean the entire test area after a major leak. Such ventilation device can be continuously operated without need for costly automated control.

This type of flow guide hood can furthermore be, easily, and even automatically, adjusted to conform to different types of packages. This is not possible if a sealed chamber must be used.

The suction opening of the flow guide can be located in the said upper wall or in one of the side walls adjacent the seal. This location of the suction opening can be used for both stepping conveyors and continuous conveyors.

According to one example, the package is located in the testing station with its sealed portion upwards to retain test gas in the package adjacent the seal to be tested. In a filling and sealing line, the package is preferably held in this position during the transportation between a sealing station and the testing station. This is typically the case when the leak detecting arrangement is arranged to test packages in the form of pliable tubes, such as toothpaste tubes or similar packages.

Packages are usually filled in a filling station and are immediately moved to a subsequent sealing station. The test gas can be supplied to an open end of a package by a supply nozzle immediately prior to sealing. This allows the sealing station to be located in the ambient atmosphere between the filling station and the testing station. Alternatively, the sealing station is located in a controlled atmosphere containing a predetermined concentration of test gas.

The test gas can contain 0.01-10 percent by volume of hydrogen ($H_2$). The main component of the remainder of the test gas is a suitable inert gas, such as nitrogen ($N_2$) or in many cases $CO_2$.

According to standards for the flammability of gas mixtures, the flammability limit for hydrogen mixed in nitrogen is 5.7%. It is preferable due to regulatory reasons to use concentration marked as non flammable. It should be noted, however, that hydrogen concentrations up to 10% are commonly used for leak detection in the different industrial applications. This can be done safely if the gas balance is an inert or a mix of inert gases. Using concentrations between the theoretically safe limit and the 10% limit will boost sensitivity and may often be worth the effort of a safety investigation.

The invention also relates to a method for detecting a leak in packages containing a product in the form of a foodstuff or a pharmaceutical, which packages contain a predetermined concentration of a test gas. The method involves the steps of;

placing a packet in a testing station, whereby a gas sensor is located in gas communication with the ambient air surrounding a portion of the package to be tested, applying a predetermined amount of pressure on the package, determining an instantaneous slope value for the concentration of test gas in the ambient air surrounding packet using the said sensor, and monitoring instantaneous slope values over time for the concentration of test gas in the ambient air surrounding packet to be tested, and generating a fault signal if an instantaneous slope value exceeds the preceding monitored instantaneous slope value.

According to one example, the method involves placing a packet to be tested adjacent the suction means and drawing ambient air through the suction means past the said sensor. This has been described in more detail above.

In particular, the method involves generating a fault signal if an instantaneous slope value determined for a current package, as pressure is being applied, exceeds the monitored instantaneous slope value determined for a preceding package.

A change in the instantaneous slope value can occur as the packages change position, when a first package leaves the test station and a subsequent package enters the test station and/or when the package is subjected to an external pressure. The instantaneous slope value changes either from a positive value to a higher positive value, or from a constant or negative value to a positive or less negative value, when a leak is present in a subsequent package that is currently placed in the test station.

By monitoring an instantaneous slope value for a curve representing the content of test gas in the ambient air drawn past a seal on each subsequent package, instead of measuring the exact concentration for each package, very short cycle times can be achieved. The response time of the sensor need not be taken into consideration, as the method monitors changes in concentration instead of absolute values or thresholds.

According to one example, the method involves continuously drawing ambient air through a suction means past a sensor and continuously or intermittently determining an instantaneous slope value for the content of test gas in the ambient air. In this case the trend of the slope value for the ambient air is monitored constantly as each subsequent package is moved into and out of the testing station, or during the dwell time when pressure is applied to the package.

According to a further example, the method involves intermittently drawing ambient air through a suction means past a sensor and intermittently monitoring an instantaneous slope value for the concentration of test gas in the ambient air. In this case the trend of the slope value can be monitored intermittently during periods of operation of the suction means or during the dwell time when pressure is applied to the package.

The method allows for cycle times of less than 0.5 s to be achieved. As stated in an example above, a speed or feed rate of about 120 units per minute, the cycle time can be approximately 0.5 seconds and the dwell time can be approximately 0.3 seconds. Pressure is applied to the package for a period of time marginally shorter than the dwell time.

When the transport means is started or after a period of time when no leaks have been detected, a first leaking package will cause the slope value to change from a constant value to a positive value when is detected. The slope value will change from a negative value to a positive value for each leaking package detected immediately after the said first package.

If desired the leak detecting arrangement can be calibrated by determining a base line for the slope value of the content of test gas in the ambient air surrounding the leak detecting arrangement. However, as the arrangement can be set to react for a change in the detected slope value, it is sufficient to detect a change in the instantaneous slope value. When the ECU detects a change causing a positive slope value this indicated a leak in the package currently located in the testing station.

The method can further involve generating a first control signal causing a leaking package to be discarded if the instantaneous slope value of a single package approaching the suction means exceeds the slope value for the curve representing the continuously monitored slope value. A leak in a single package may be caused by a flaw in the material in the region of the seal, or by a droplet or smear of the filled material in the area where the sealing is to be made. Alternatively, the area of the seal may be insufficiently heated prior to the closing of the package. In such cases there is no cause for stopping the packaging process. However, a warning signal could be issued to an operator, indicating that a leaking package has been detected and discarded from the transporting means.

The method can also involve generating a further, second control signal causing a packaging process to stop if the instantaneous slope value of successive package exceeds the slope value for a curve representing the continuously or intermittently monitored slope value each time a subsequent package is placed adjacent the suction means and subjected to a predetermined pressure. Multiple successive leaking packages can be an indication that there is a malfunction in the sealing station, which requires the transporting means to stop to allow for adjustments or repairs to be carried out.

In operation, a line of packages are filled at a package filling station and are conveyed to a subsequent sealing station. In the sealing station, a quantity of test gas is supplied from a nozzle is directed towards the open end of the package to be sealed. The test gas serves the dual purpose of preventing oxidation of the filled contents and acting as a test gas in a subsequent leak detecting arrangement. The package is then sealed by a suitable sealing means and is then passed on to the leak detecting arrangement.

The leak detecting arrangement comprises a suction means which is arranged to be located stationary adjacent the sealed portion of a packet to be tested for the duration of a test cycle. Alternatively, the sealed portion of a packet to be tested is displaced past the suction means during the test cycle. The duration of the test cycle is therefore dependent on the dwell time of an intermittently moving transport means, or alternatively on the constant speed of a continuously moving transport means. When the package is located adjacent the seal in the test station, a force applying means is actuated to apply a predetermined pressure to the package adjacent the seal. This causes an overpressure in the package, whereby the enclosed test gas can escape if a defect is present in the seal. The size of hole that can be detected by the method is dependent on the cycle time. For instance, if it is desired to detect non-welded packages or partially welded seals, i.e. relatively large openings, the cycle time can be relatively short. A cycle time for this purpose can be about 0.5 seconds. In general, the definition of a "short" cycle time in relation to the recovery time of the sensor is a cycle time less than 1 second.

The gas sensor is arranged to output a continuous analogue signal where a generated voltage is proportional to the amount of leaking gas per unit time. If the gas sensor is to be calibrated using the ambient air at the location of the leak detecting arrangement adjacent the transporting means, this is carried out before the first package reaches the testing station. The continuous analogue signal is transmitted to an electronic control unit, or ECU, arranged to process and continuously or intermittently monitor the output signal from the sensor.

The ECU comprises an A/D converter for converting the analogue signal into a digital signal, and a first processor for calculating the instantaneous slope value of a curve representing the concentration of test gas over time for the digital voltage signal. The ECU is arranged to process and continuously or intermittently monitor the value of the slope calculated by the A/D converter. When the gas sensor is calibrated, the ECU will determine an instantaneous slope value for a curve representing the content of test gas in the ambient air surrounding the leak detecting arrangement. This slope value represents the condition where no leaking packages are detected. Hence, when the ECU receives a constant continuous signal from the sensor, which signal has known substantially constant slope value representing a horizontal line, then no leaking packages are being detected.

However, when the ECU receives a signal from the sensor that indicates a change in the detected instantaneous slope value relative to the slope value of the monitored continuous or intermittent signal, this determines that a leak of test gas has occurred. An increase in the calculated value of the slope of the detected signal, that is a positive slope value, indicates a leak in the tested package. The ECU will then generate a fault signal, which signal is transmitted to a subsequent removal unit for removing the leaking package or packages from the conveyor. Alternatively, the signal may alert an operator who may remove the package manually and/or perform an inspection of a package sealing unit upstream of the leak detecting arrangement.

As the package is removed from the test area, ambient air drawn past the sensor by the suction means will dilute the leaked gas and cause the continuous analogue signal to drop. Consequently the slope value of the digital signal will change, in that it will decrease and eventually become negative, as the concentration of leaked gas is continuously reduced. If the subsequent packages are properly sealed then the leaked gas will be flushed out of the detecting arrangement and the output signal from the sensor will decrease and eventually return to its initial base line or a calibrated level.

However, if multiple packages with leaking seals are passed through the leak detecting arrangement in succession, then the output signal from the sensor will not return to its initial level between each package to be tested. The slope value of the digital signal will begin to change and the concentration of leaked gas is continuously reduced, as the external pressure is removed and the package leaves the testing station. When the package has left the testing station, the slope value of the digital signal represented by the said curve has increased to a maximum and has begun to level out, has levelled out or has begun to decrease when the instantaneous slope value determined for a current package exceeds the continuously or intermittently monitored slope value represented by the said curve. The slope value can change from a positive value to a higher positive value, or from a substantially constant value, near a maximum of the curve, to a positive value as the next leaking package enters the testing area and is subjected to an external pressure.

This method allows for relatively short cycle times as the sensor can detect multiple successive leaking packages without having to be flushed clean by ambient air to return the output signal to its initial base line or a calibrated level.

If multiple leaking packages are detected the signal processing means will generate a further fault signal, for instance after a predetermined number of subsequent detected leaking packages. The further fault signal is transmitted to an electronic control unit for controlling the filling and sealing arrangements. The transport means is then stopped, as this further fault signal indicates a malfunction in the said package sealing unit.

The invention further relates to a packaging machine comprising a filling station and a sealing station, wherein the packaging machine is provided with a leak detecting arrangement according to the invention. This arrangement allows the products to be tested for leaks immediately after filling and sealing. In this way it is possible to detect short term leakages, avoiding partial or complete loss of gas from a partially or completely unsealed package, caused by e.g. a failure of the sealing unit.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein:

FIG. 1 shows a schematic filling and sealing line provided with a leak detecting arrangement according to the invention;

EMBODIMENTS OF THE INVENTION

Figure 2B:
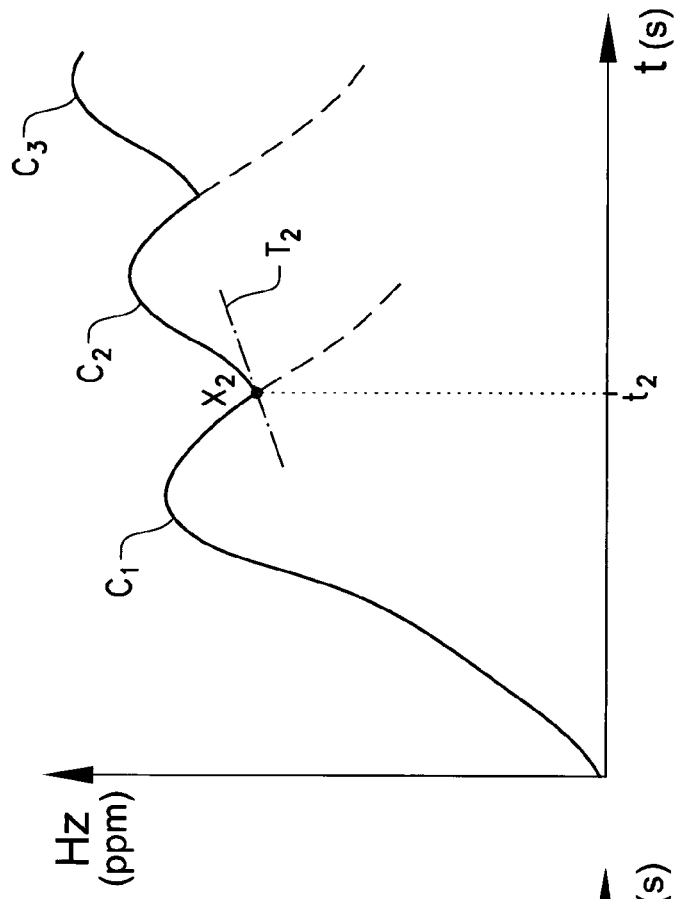
FIG. 2B shows a diagram indicating test gas concentration over time for multiple leaking packages.

FIG. 1 shows a schematic a packaging machine comprising a filling station 1 and a sealing station 2, wherein the packaging machine is provided with a leak detecting arrangement according to the invention. In the figure, multiple packages $P_1$, $P_2$, $P_3$, here in the form of tubes, are filled at the package filling station 1 and are moved to the subsequent sealing station 2 by an intermittently moving conveyor 4. In the sealing station 2, a quantity of test gas is supplied from a nozzle 5 is directed towards the open end portion 6 of the package $P_2$ to be sealed. The package $P_2$ is then sealed by a suitable sealing means 7, such as heating by hot air or by ultrasonic means, and is then moved on to a testing station 3 on the leak detecting arrangement.

The leak detecting arrangement comprises a suction means 8 which is arranged to be located stationary adjacent the sealed end portion 9, or seal, of a packet $P_3$ to be tested for the duration of a test cycle. When the package is located adjacent the seal in the test station, a force applying means is actuated to apply a predetermined pressure to the package adjacent the seal. This causes an overpressure in the package, whereby the enclosed test gas can escape in the package if a defect is present in the seal.

Alternatively, the sealed portion of a packet to be tested is displaced past the suction means during the test cycle.

Ambient air is drawn past the sealed end portion 9 through a suction opening 10 of the suction means 8 and past a gas sensor 11. A pump 12 is located downstream of the sensor 11 to provide a source of low pressure. The gas sensor 11 is arranged to output a continuous analogue signal where a generated voltage is proportional to the amount of leaking gas per unit time.

The continuous analogue signal is transmitted to an electronic control unit ECU arranged to process and continuously monitor the output signal from the sensor 11.

The ECU comprises an A/D converter for converting the analogue signal into a digital signal, and a first processor for calculating the instantaneous slope value of a curve representing the concentration of test gas over time for the digital voltage signal. The ECU is arranged to process and continuously monitor the value of the slope calculated by the A/D converter. When the gas sensor is calibrated, the ECU will determine an instantaneous slope value for a curve representing the content of test gas in the ambient air surrounding the testing station 3. This slope value represents the condition where no leaking packages are detected. Hence, when the ECU receives a constant continuous signal from the sensor, which signal has known substantially constant slope value representing a horizontal line when no test gas is present, then no leaking packages are being detected.

Figure 2A:
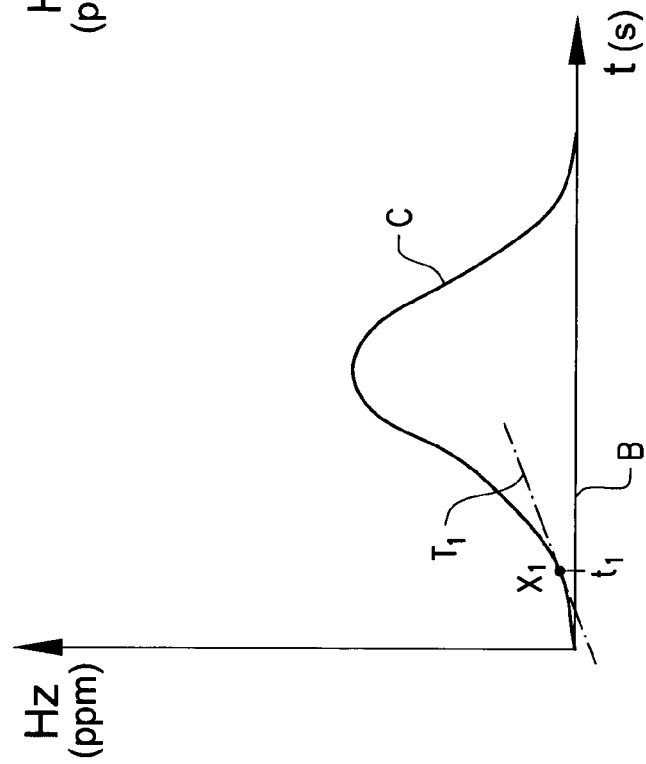
FIG. 2A shows a diagram indicating test gas concentration over time for a single leaking package.

FIG. 2A shows a diagram indicating test gas concentration over time for the case where a single leaking package is detected, where the test gas concentration is shown as Hz(ppm) on the y-axis and where the x-axis shows the time as t(s). The same applies to FIG. 2B and FIG. 2C. As can be seen from the figure, the measured concentration of test gas, in this case hydrogen, increases from an initial base line value until it reaches a maximum. As the package is removed from the testing station, ambient air drawn past the sensor 11 will gradually dilute the test gas concentration and the sensed concentration will drop back down to the initial base line value. From FIG. 2A it can be seen that at the time $t_1$, shortly after test gas has been detected, the tangent $T_1$ of the curve C will have a positive instantaneous slope value indicating a leaking package.

When the ECU receives a signal from the sensor that indicates a change in the instantaneous slope value relative to the slope value of the continuous signal, this determines that a leak has occurred. An increase in the calculated value of the slope of the detected signal, that is a positive slope value, indicates a leak in the tested package. The ECU will then generate a fault signal, which signal is transmitted to a subsequent removal unit for removing the leaking package from the conveyor.

As the package is removed from the test area, ambient air drawn past the sensor by the suction means will dilute the leaked gas and cause the continuous analogue signal to drop. Consequently the slope value of the digital signal will change and become negative, as the concentration of leaked gas is continuously reduced. If the subsequent packages are properly sealed then the leaked gas will be flushed out of the detecting arrangement and the output signal from the sensor will return to its initial level.

FIG. 2B shows a diagram indicating test gas concentration over time for the case where multiple packages are detected. As in FIG. 2A, the measured concentration of test gas increases from an initial base line value until it reaches a maximum for a first leaking package, as described above. As the first package is removed from the testing station, ambient air drawn past the sensor 11 will gradually dilute the test gas concentration and the sensed concentration will begin to drop back down towards the initial base line value. The slope value of the digital signal will begin to change and become negative, as the concentration of leaked gas is continuously reduced, as indicated by the curve $C_1$. However at the time $t_2$ the next leaking package is placed in the testing station and the slope value will change back to positive, as indicated by the tangent $T_2$ at the point $X_2$.

If multiple packages with leaking seals are passed through the leak detecting arrangement in succession at a relatively long cycle time, then the output signal from the sensor will not return to its initial level between each package to be tested. The slope value of the digital signal will have sufficient time to change and become negative, as the concentration of leaked gas is continuously reduced, as indicated by the curve $C_2$. However, the slope value will change back to positive as the next leaking package enters the testing area, as indicated by the curve $C_3$. When multiple leaking packages are detected, The ECU will then generate a further fault signal, which signal causes the filling and sealing line to stop in order to allow adjustments and/or repairs to be carried out.

Figure 2C:
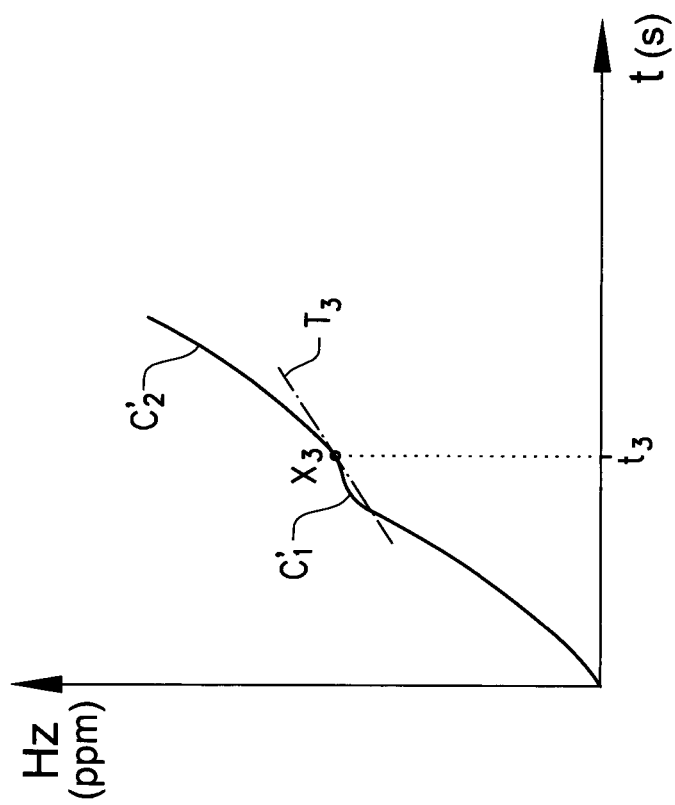
FIG. 2C shows an alternative diagram indicating test gas concentration over time for multiple leaking packages.

FIG. 2C shows an alternative diagram indicating test gas concentration over time for the case where multiple packages are detected. As in FIG. 2B, the measured concentration of test gas increases from an initial base line value until it a first leaking package is removed from the testing station. As the first package is removed from the testing station, ambient air drawn past the sensor 11 will gradually dilute the test gas concentration and the sensed concentration will begin to drop. The slope value of the digital signal will still be positive but will begin to change and be reduced as the curve $C'_1$ approaches its maximum value. As the concentration of leaked gas is continuously reduced, the slope value would first go to zero and then become negative if no subsequent leak is detected. However at the time $t_3$ the next leaking package is placed in the testing station and the positive slope value will increase from a lower value, as indicated by the tangent $T_3$ at the point $X_3$ and by the curve $C'_2$.

If multiple packages with leaking seals are passed through the leak detecting arrangement in succession at a relatively short cycle time, then the output signal from the sensor will have less time to reset to its initial level between each package to be tested. The slope value of the digital signal will begin to change and be reduced, as the concentration of leaked gas is continuously reduced, as indicated by the curve $C'_1$. However, due to the relatively short cycle time, the curve $C'_1$ never reaches its maximum before a subsequent leaking package is detected. The slope value will change from a first positive value to a second positive value exceeding the said first value as the next leaking package enters the testing area, as indicated by the curve $C'_2$. When multiple leaking packages are detected, for instance three consecutive leaking packages, the ECU will then generate a further fault signal, which signal causes the filling and sealing line to stop in order to allow adjustments and/or repairs to be carried out.

Figure 3:
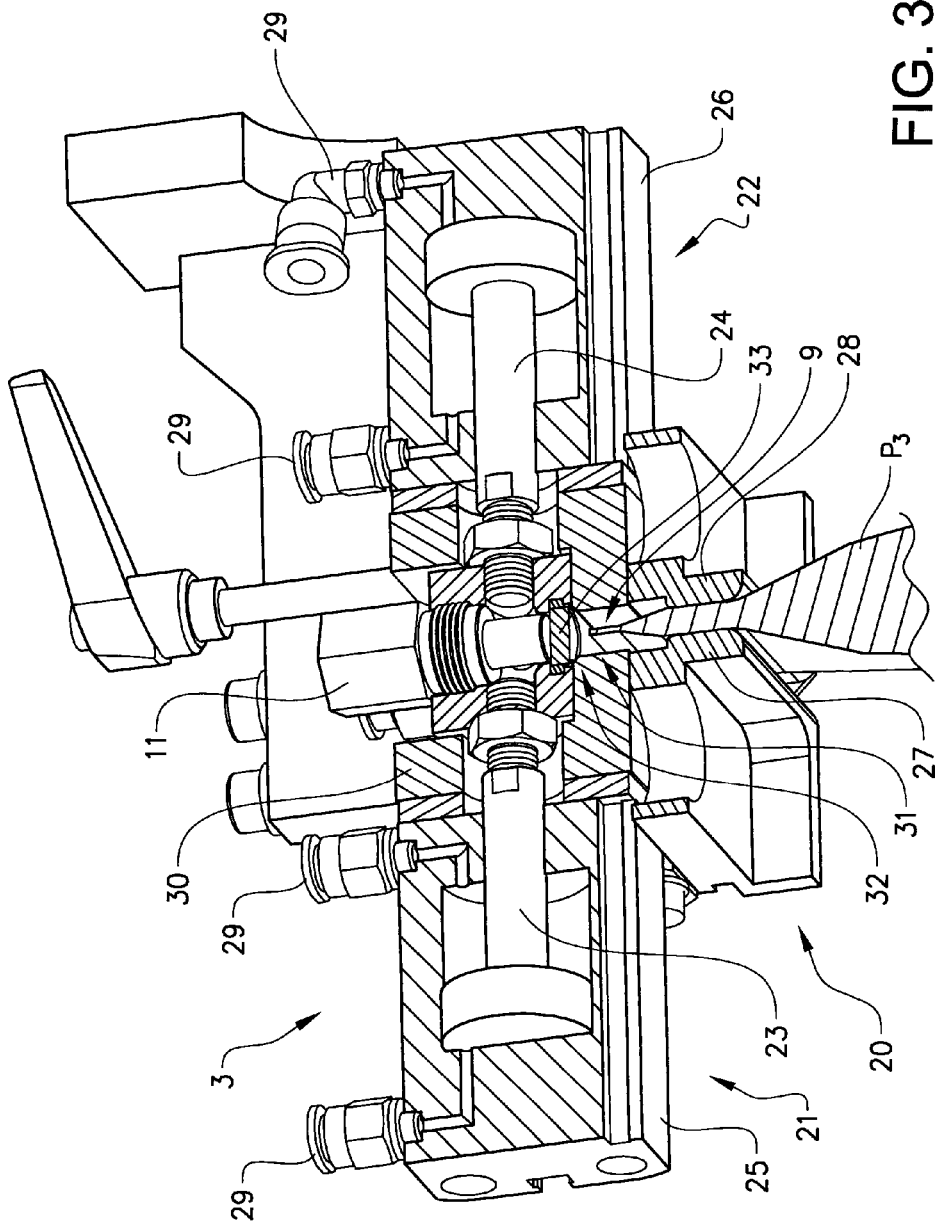
FIG. 3 shows a partial cross-section through the testing station 3 in a vertical plane through a longitudinal axis of a package.

FIG. 3 shows a partial cross-section through the testing station 3 in a vertical plane through a longitudinal axis of a package P3 to be tested, in this case a pliable tube placed with its cap downwards in a holder on a conveyor (not shown) and its sealed end upwards into the testing station. The cross-section is taken through a force applying means 20 used for applying a predetermined pressure on the tube P3 located in the testing station 3. Pressure is applied the tube P3 in a region located below the seal by a pair of opposed fluid actuators 21, 22 attached to the testing station 3 above the tube to be tested. The fluid actuators 21, 22 each comprise a piston 23, 24 fixedly attached to a support 30 between the actuators, and a cylinder 25, 26 displaceable relative to the fixed support 30. The fluid actuators 21, 22 are operated by means of air pressure supplied from a source of compressed air (not shown) through inlet/outlet ports 29 on the cylinders 25, 26. Operation of the actuators is carried out by means of controllable valves (not shown), causing the cylinders 25, 26 to be displaced from a position remote from the fixed support 30 to a position adjacent the said support 30. The latter position is shown in FIG. 3. In this position, opposing clamping means 27, 28 are arranged to apply a predetermined pressure on the upper portion of the tube P3 below the seal to be tested. In this position, the facing portions of the cylinders 25, 26 and the opposing clamping means 27, 28 form a partially enclosed space 31 comprising a pair of opposing side walls, extending upwards into the support 30, and an upper wall, comprising a lower surface of the support 30, forming an inverted U-shaped channel. The purpose of the partially enclosed space 31 is to guide ambient air past the seal as it flows towards the sensor 11. The suction opening 32 is located in the upper wall in the support 30 adjacent the seal. The sensor 11 is mounted in a bore extending through the body of the support 30 immediately above the suction opening 32 In order to prevent dust or particles from coming into contact with the sensor 11, a filter 33 is placed in the suction opening 32.

Figure 4:
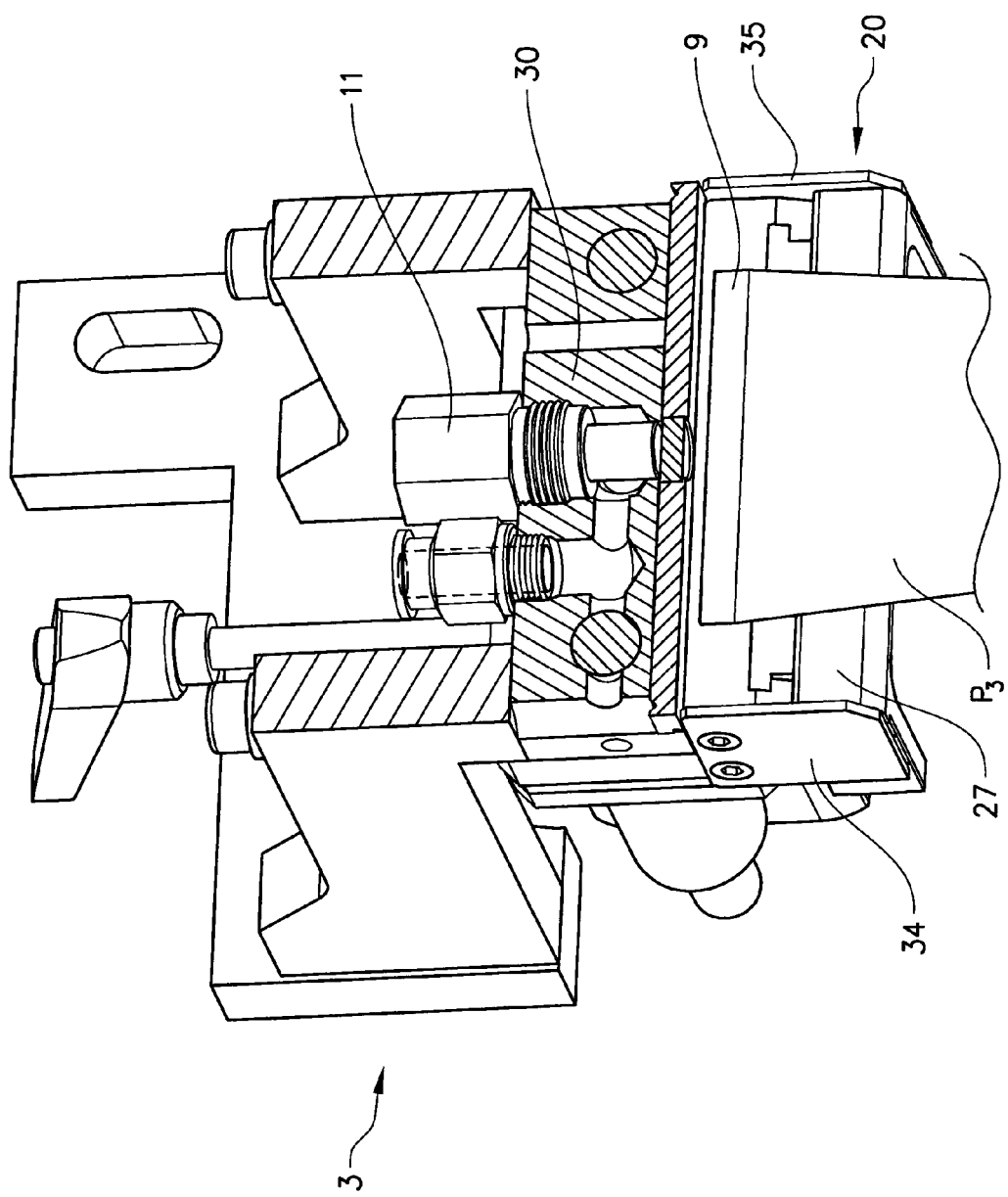
FIG. 4 shows a partial cross-section through the testing station 3 in a vertical plane at right angles to the vertical plane in FIG. 3.

FIG. 4 shows a partial cross-section through the testing station 3 in a vertical plane at right angles to the vertical plane in FIG. 3. FIG. 4 shows the tube P3 and its seal located at the upper end of the tube P3 above and parallel to one of the clamping means 27. Attached to each end of the clamping means 27 are end walls 34, 35, which contribute to the forming of a flow guide means around the seal. Similar end walls are arranged on the opposing clamping means 28. As the cylinders 25, 26 and their clamping means 27, 28 are displaced towards the tube P3, the end walls further restrict the flow of ambient air drawn past the tube. The flow guide means is preferably positioned to extend around the entire outer periphery of the seal and a predetermined distance past the seal over the tube P3. This arrangement is used for guiding ambient air, causing it to flow upwards past the seal before being drawn through the suction opening 32 to the sensor 11 (see FIG. 3). The flow guide means reduces the volume of ambient air around the seal, which allows relatively low concentrations of leaking gas to be detected. Also, a jet leakage at or adjacent the seal may be directed away from the sensor 11. For instance, a narrow jet of gas may escape in a direction angled downwards relative to the seal shown in FIG. 3 when pressure is applied. As the flow guide means reduces the volume of ambient air around the seal, the velocity of the ambient air drawn past the seal is increased, as compared with an arrangement lacking such a flow guide means. In this way the flow created by the suction means will have a velocity that allows this type of jet leakage to be detected.

The invention claimed is:

1. A leak detecting arrangement for packages, which packages contain a test gas, which leak detecting arrangement is located adjacent a transport arranged to transport the packages, the arrangement comprising:
   a testing station in which a package is located by the transport, wherein the packages are arranged to have an internal pressure above the ambient pressure when located in the testing station,
   a gas sensor located in gas communication with the ambient air surrounding a portion of the package to be tested, wherein the sensor is arranged to detect the concentration of test gas in said ambient air and transmit a signal representing said concentration,
   an electronic control unit arranged to receive the signal from the gas sensor, wherein the electronic control unit is arranged to determine an instantaneous slope value for the concentration of test gas in the ambient, to monitor instantaneous slope values over time and to generate a fault signal if an instantaneous slope value exceeds the preceding monitored instantaneous slope value,
   a continuously operated suction arranged to draw ambient air past a seal on the packet to be tested, wherein the continuously operated suction is provided with a flow guide conforming to the shape of the seal, and
   a pair of opposing fluid actuators and opposing clamping means, wherein the clamping means are arranged to apply a predetermined pressure on the upper portion of the package below the seal to be tested in order to form a partially enclosed space with the fluid actuators such as to contribute to the forming of a flow guide around the seal and guide ambient air past the seal.

2. A leak detecting arrangement according to claim 1, wherein the flow guide is arranged to extend around the outer periphery of the seal and extend a predetermined distance past the seal over the package.

3. A leak detecting arrangement according to claim 1, wherein the gas sensor is located in the flow of ambient air drawn off by the suction.

4. A leak detecting arrangement according to claim 1, wherein an open hood is arranged to enclose the seal, which hood is arranged to conform to the shape of the seal.

5. A leak detecting arrangement according to claim 1, wherein a force is arranged to apply a predetermined pressure on at least one side of the package located in the testing station.

6. A leak detecting arrangement according to claim 5, wherein the force is arranged to contact the package on opposite sides of the exterior of the package and apply a predetermined pressure or force to the package adjacent the seal.

7. A leak detecting arrangement according to claim 1, wherein the package is located in the testing station with its sealed portion upwards to retain test gas in the package adjacent the seal to be tested.

8. A leak detecting arrangement according to claim 1, wherein the leak detecting arrangement is arranged to test packages in the form of pliable tubes.

9. A leak detecting arrangement according to claim 1, wherein the tested packages contain a perishable product in the form of a foodstuff, a pharmaceutical substance or a chemical or a cosmetic product.

10. A packaging machine comprising a filling station for filling consecutive products and a sealing station for sealing the products, wherein the packaging machine further comprises a leak testing arrangement according to claim 1 after the sealing station.

* * * * *